United States Patent [19]

Smith

[11] Patent Number: 4,490,500
[45] Date of Patent: Dec. 25, 1984

[54] COMPLETELY SOLVENTLESS TWO COMPONENT RTV SILICONE COMPOSITION

[75] Inventor: Robert A. Smith, Schenectady, N.Y.

[73] Assignee: General Electric Company, Waterford, N.Y.

[21] Appl. No.: 238,302

[22] Filed: Feb. 26, 1981

[51] Int. Cl.$^3$ ............................................. C08L 83/06
[52] U.S. Cl. ..................... 524/378; 524/425; 524/500; 524/588; 525/477; 528/12; 528/18
[58] Field of Search .............. 525/477; 524/378, 500, 524/588, 425

[56] References Cited

U.S. PATENT DOCUMENTS

| | | | |
|---|---|---|---|
| 3,186,963 | 6/1955 | Lewis et al. | 528/18 |
| 3,205,283 | 9/1965 | Modic | 525/477 |
| 3,888,815 | 6/1975 | Bessmer et al. | 260/37 SB |

*Primary Examiner*—Wilbert J. Briggs, Sr.

[57] ABSTRACT

A self-bonding solventless room temperature vulcanizable silicone rubber composition comprising a silanol polymer, a resinous copolymer composed of monofunctional siloxy units and tetrafunctional siloxy units, an alkyl silicate or partial hydrolysis products of an alkyl silicate as a cross linking agent which is pre-reacted with a tin salt of a carboxylic acid, and as a self-bonding additive, a nitrogen functional silane. This composition which can be made either clear or opaque is utilized with advantage for encapsulating photovoltaic cells and potting automotive electrical components.

16 Claims, No Drawings

COMPLETELY SOLVENTLESS TWO COMPONENT RTV SILICONE COMPOSITION

BACKGROUND OF THE INVENTION

The present invention relates to a two component room temperature vulcanizable silicone rubber composition and more particularly, the present invention relates to a completely solventless two component room temperature vulcanizable silicone rubber composition.

Two component room temperature vulcanizable silicone rubber compositions are well known ("room temperature vulcanizable" shall hereinafter in this application be referred to as RTV). Generally, such two component RTV compositions or two part RTV compositions comprise as a basic ingredient a silanol end-stopped diorganopolysiloxane polymer an alkyl silicate or a partial hydrolysis product of an alkyl silicate as a cross linking agent and a tin salt of a carboxylic acid with such tin salt of a carboxylic acid preferably being used as the curing catalyst. Such composition is two component, or two part, in that all the ingredients are not packaged in the same package; that is normally the alkyl silicate is packaged with a tin salt or with the silanol polymer and the tin salt is maintained separate from the silanol polymer. When it is desired to cure the composition, the two packages or two components are mixed and the compositions are allowed to cure at room temperature.

Such compositions may include self-bonding additives such as nitrogen functional silanes, various of fillers, both reinforcing and extending, flame retardant additives, heat agent additives, and oil resistant additives and other types of additives. An example of such a two component RTV composition with self-bonding additives added to it is for instance disclosed in Bessmer et al. U.S. Pat. No. 3,888,815 which is hereby incorporated by reference. Such compositions are also disclosed in which the alkyl silicate is pre-reacted with a tin salt at temperatures in the range of 80°–200° C. for at least 20 minutes and then after being pre-reacted, being utilized in the two component RTV composition. The reasons for pre-reacting the catalyst, as disclosed in Lewis et al. U.S. Pat. No. 3,186,963 which is hereby incorporated by reference, are that the simple mixture of the tin salt with the cross linking agent has a freezing point which is high enough to preclude its use as a liquid catalyst at low temperatures and that the activity of the tin salt and alkyl silicate varies from batch to batch, unless it is pre-reacted as outlined in the foregoing Lewis et al patent.

An improvement over that system is the patent of Smith et al. U.S. Pat. No. 3,957,704 in which the pre-reacted catalyst system in addition to the alkyl silicate and the tin salt also contains a silanol containing polysiloxane fluid. The advantage of the Smith system was that the silanol containing polysiloxane which was pre-reacted into the tin salt-alkyl silicate system resulted in a product with an extended shelf life and did not have the limited shelf life of the prior art Lewis U.S. Pat. No. 3,186,963 system.

Another disclosure which is to be referred to is the disclosure of Modic U.S. Pat. No. 3,457,214 which discloses two component RTV composition comprising a silanol polymer, a resinous copolymer composed of monofunctional siloxy units and tetrafunctional siloxy units, a reinforcing silica filler and a metal salt of carboxylic acid as a particular type of catalyst. It is stated that it was possible by such a composition to incorporate silica filler in the two component system and also to make a clear see-through mold with such a system. Accordingly, the resinous copolymer composed of monofunctional siloxy units and tetrafunctional siloxy units allows the production of a two component system. However, the composition did not cure as rapidly as would be desired. In addition, it was necessary to have solvent in the system since the resinous copolymer had first to be dissolved in a solvent before it could be incorporated into the silanol end-stopped polymer.

The improvement over such a system is disclosed in Modic U.S. Pat. No. 3,205,283 which discloses taking the mixture of silanol polymer and organic solvent solution of the resinous copolymer, mixing them together and then stripping the solvent off by heating the mixture at temperatures from about 40° C. to a temperature equal to the boiling point of the solvent. However, even in such a system, it was necessary to disperse the tin salt or the other catalyst in a solvent so as to form the second component so they could be dispersed homogeneously into the first component to produce the final cured composition. Accordingly, although the disclosure of Modic U.S. Pat. No. 3,205,283 removed the solvent in the basic component of the system, it did not remove the solvent in the tin portion of the system. It should be noted that the disclosure of Modic U.S. Pat. No. 3,205,283 reduced the amount of solvent that was in the system from roughly 20% to about 4 or 5 percent. It was still desirable to remove all of the solvent from the system, since solvents create pollution problems, and it is desirable to remove all of the solvent from the system, having a completely solventless system.

The solvent is removed from the tin salt in the system of Modic U.S. Pat. No. 3,205,283. The tin cannot be properly or uniformly dispersed in the other component of the two packaged system. If the tin salt is mixed with the other ingredients, it will precipitate out from the other ingredients and will not be able to uniformly disperse into the basic component containing the silanol polymer. It should be further noted that previously there was prepared a composition containing a silanol polymer, a resinous copolymer composed of monofunctional siloxy units and tetrafunctional siloxy units which comprised one component of the two component system in which the second component comprised an akyl silicate, tin salt and a nitrogen functional self-bonding additive. However, in such a system, there was utilized a solvent in the second component so as to dissolve and uniformly disperse all the three components so as to form a uniform component. Then when it was necessary to use the system, the second component or a catalyst component would be mixed into the first component to form a system which could be applied to cure to a silicone elastomer. Accordingly, even this system was not solventless.

Two new applications have arisen for such two component RTV systems. One new application in which organics have been used previously, is to encapsulate photovoltaic cells. The organics that were used previously do not have any solvents, however, they would color or change color upon being exposed to ultra violet light for any period of time and would thus, cause interference with the passage of light into the photovoltaic cell. The other problem with organics was that such organics would be embritteled by the passage of time and by weathering, such that the organics will turn into powder and break off. Accordingly, it was highly desirable to develop a solventless silicone composition which would be utilized to encapsulate photovoltaic cells. It was also necessary that such encapsulated silicone composition be clear and not change color with the passage of time upon being exposed to ultraviolet light. Accordingly, it was highly desirable to have an encapsulant for photovoltaic cells which was a clear material and which had good adhering self-bonding properties and which would not be affected by weathering as most silicones are not and would not change color upon being exposed to ultraviolet light for extended periods of time. Another application in which it was desired to have a two component RTV composition, was a potting composition for automotative electrical components. For such a composition, it was necessary that the composition be opaque, as was desired by the customer, that the composition be of low viscosity in the uncured state such that it could fill voids and release entrapped air therefrom, upon curing and that it would have good self-bonding properties to the underlying electrical component.

Accordingly, it is one object of the present invention to provide for a two component RTV composition which is completely solventless (i.e. Hydrocarbon and aromatic solvents). It is an additional object of the present invention to provide a two component RTV composition which is completely solventless and has reasonable strength properties.

It is still an additional object of the present invention to provide for two component RTV compositions which are completely solventless and which can be utilized to encapsulate photovoltaic cells as well as encapsulate automotative electrical components.

It is yet an additional object of the present invention to provide for a process for producing a two component RTV composition which is completely solventless and is suitable as an encapsulating composition for photovoltaic cells and also as a potting composition for automotative electrical components.

These and other objects of the present invention are accomplished by means of the disclosure set forth herein below.

SUMMARY OF THE INVENTION

In accordance with the above objects, there is provided by the present invention, a self-bonding solventless (no hydrocarbon or aromatic solvents) room temperature vulcanizable silicone rubber composition comprising (1) 100 parts by weight of a first mixture containing:

(A) 83–98.6 parts by weight of a silanol end-stopped diorganopolysiloxane polymer with a viscosity varying from 100 to 4,000 centipoise at 25° C. and where the organo groups are monovalent hydrocarbon radicals and (B) from 1.4 to 17 parts by weight of resinous copolymer containing $R_3SiO_{0.5}$ units and $SiO_2$ units where R is a monovalent hydrocarbon radical and where, in said copolymer has a molar ratio of $R_3SiO_{0.5}/SiO_2$ of; and (2) from 1 to 20 parts by weight of a catalyst mixture having c from 10 to 50 parts by weight of an alkyl silicate of the formula, $$R_m{}^1Si(OR^2)_{4-m} \qquad (1)$$

and partial hydrolysis products thereof, where $R^1$, $R^2$ are monovalent hydrocarbon radicals, m is o or 1, and is pre-reacted with (D) 10 parts by weight of a tin salt of a carboxylic acid and (E) from 10 to 30 parts by weight of a self-bonding additive having the formula,

where $R^3$ is a monovalent hydrocarbon, radical E is a hydrolyzable group selected from the class consisting of alkoxy, phenoxy, amino, and dialkylamino and $\theta$ is a nitrogen-functional radical which is reacted, with saturated, unsaturated or aromatic hydrocarbon residues which in addition to nitrogen-functionality may be functionalized by a radical selected from the class consisting of amino, cyano, thio, oxo and ester, and combinations thereof and a is a number which varies from 0 to 2. In such a composition, preferably the silanol polymer which can be a blend of silanol polymers is pre-mixed with the resinous copolymer composed of monofunctional siloxy units and tetrafunctional siloxy units and heated to above 40° C. so as to remove the solvent and then so as to form one component of the mixture. Then in the second component the tin salt is pre-reacted with the alkyl silicate or partial hydrolysis product of the alkyl silicate, so as to solubilize the tin salt so that an aromatic or hydrocarbon solvent is not necessary in a second component. The nitrogen functional silane is soluble in such a pre-reacted product and accordingly the entire three ingredients in the seoond component form one solution, which uniform mixture or solution can be applied as desired to the second component to form an RTV composition. The RTV composition upon being mixed will skin over in about 30 minutes to 1 hour and will cure to a silicone elastomer with final cure taking place in a period of time varying from 24 hours to 72 hours.

DESCRIPTION OF THE PREFERRED EMBODIMENT

It should be noted that the present composition is a two component, or as otherwise known, a two part or two package RTV composition and that it is manufactured and sold in two different components. Only when it is desired to cure the composition to a silicone elastomer are the two packages or two components mixed and applied to whatever form is desired. Upon such mixing, the composition cures to a tack free state in about 20 minutes to 1 hour with final cure taking place in 24 hours to 72 hours.

In the basic mixture there is present 100 parts by weight of a first mixture, or component containing anywhere from 83 to 98.6 parts by weight of a silanol end-stopped diorganopolysiloxane polymer with a viscosity varying from 100 to 4,000 centipoise at 25° C. where the organic groups are monovalent hydrocarbon radicals. The organic groups can be any one of the hydrocarbon radicals, such as alkyl radicals, such as methyl, ethyl, propyl etc.; cycloalkyl radicals, such as cyclohexyl, cycloheptyl, alkenyl such as vinyl, allyl etc. mononuclear aryl radicals, such as phenyl, methylphenyl, ethylphenyl, etc., fluoropropyl radicals, such as 3,3,3-trifluoro propyl.

Preferably, the silanol end-stopped polymer has the formula:

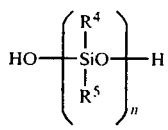

(3)

where $R^4$ and $R^5$ are the same or different and are monovalent hydrocarbon radicals, where n varies so that the polymer has a viscosity varying from 100 to 4,000 centipoise at 25° C. Preferably, the polymer has a viscosity varying from 100 to 2,000 centipoise at 25° C. The $R^4$ and $R^5$ radicals can be any of the radicals given previously for the organic radicals in the definition of diorganopolysiloxane polymer. The silanol end-stopped polymer can be a polymer of substantially one viscosity or it may be a blend of two polymers of different viscosities to arrive at a final silanol end-stopped polymer blend that has a viscosity varying from 100 to 4,000 centipoise at 25° C. It should be noted that the viscosity in solar applications can be higher. However for a potting composition and for a potting use, it is preferred that the viscosity of a silanol polymer does not exceed 4,000 centipoise at 25° C. or the viscosity of the blend of silanol polymer does not exceed 4,000 centipoise at 25° C. so that the final mixed RTV composition does not have a viscosity that exceeds 5,000 centipoise at 25° C. This low viscosity is necessary if the composition is to act as a proper potting compound to fill the voids in electrical components and to rid itself of any entrapped air.

Accordingly, the silanol polymer can be a blend of two or more silanol diorganopolysiloxane polymers wherein one of the silanol polymers has a viscosity in the range of 1,000 to 10,000 centipoise at 25° C. and wherein the second silanol polymer has a viscosity in the range of 10 to 1,500 centipoise at 25° C. As noted within the above specification, there can be any other polymers present which have a viscosity in the range of 100 to 4,000 centipoise at 25° C. It is only necessary in the final polymer blend that the viscosity vary from 100 to 4,000 centipoise at 25° C.

The silanol polymer is produced either by a batch process or continuous process. One method of producing a silanol polymer is to take the appropriate organopolysiloxanes and equilibrate them by reacting them in the presence of small amounts of potassium hydroxide catalyst at elevated temperatures, that is about 100° C. and more preferably at temperatures above 150° C. At that temperature, the cyclopolysiloxane such as octamethyltetracyclo polysiloxane is equilibrated along with the appropriate amount of chainstoppers, such as for instance, water or a low molecular weight silanol terminated diorganopolysiloxane, to form a silanol end-stopped diorganopolysiloxane polymer. The most preferred chain stopping agent is water since it is cheaper and is quite effective especially in the continuous processes. The amount of water is determined by the viscosity of the diorganopolysiloxane polymer that is desired or the molecular weight of the end product diorganopolysiloxane product that is desired. Upon being equilibrated, the cyclo polysiloxane forms the silanol end-stopped diorganopolysiloxane polymer. At that point, the mixture is cooled, the catalyst is neutralized with phosphoric acid or a silyl phosphate and then the mixture is heated at elevated temperatures to remove the unreacted cyclics.

It should be noted that in a continuous process for producing the silanol end-stopped diorganopolysiloxane polymer or a blend of polymers, that the mixture is not cooled before it is neutralized, and indeed it does not have to be so cooled, since the polymer mixture has to be heated at temperatures above 50° C. to remove the un-reacted cyclics from the polymer mixture.

Along with the silanol end-stopped polymer, there is present the resinous copolymer which is composed of the monofunctional siloxy units and the tetrafunctional siloxy units in the ratio shown previously. It should be noted that the R group can be any one of the hydrocarbon radicals such as, for instance specified for the organic groups and the $R^4$ and $R^5$ groups of the silanol end-stopped polymer. Preferably, the R is selected from methyl or 3,3,3-trifluoropropyl or a mixture thereof, and most preferably the resinous copolymer is a resinous copolymer composed of $(CH_3)_3SiO_{0.5}$ units and $SiO_2$ units where the ratio of the monofunctional units to the tetrafunctional units is from 0.5 to 1; to 1 to 1. The various substitute groups which the resinous copolymer can have as well as to the method for preparing them is set forth in Modic U.S. Pat. No. 3,457,214 and Modic U.S. Pat. No. 3,205,283 and accordingly they will not be gone into detail here. The preparation of such resinous copolymer is well within the skill of the art and is easily prepared.

It should also be noted that the process for preparing the silanol end-stopped polymer is set forth among other places in Bessmer et al. U.S. Pat. No. 3,888,815 which is hereby incorporated by reference. However, it should be noted there are other processes for preparing such silanol end-stopped polymer. In 100 parts of the first mixture, there is combined anywhere from 83 to 98.6 parts of a silanol end-stopped polymer as defined previously with from 1.7 to 17 parts by weight of a resinous copolymer. As pointed out in U.S. Pat. No. 3,205,283 the resinous copolymer is preferably added in a solvent solution such as toluene and after it is added, the solvent is removed by heating the solution at a temperature above room temperature to the temperature of the boiling point temperature of the solvent. Thus, there can be utilized a temperature of anywhere from 40° C. to as much as 150° C. Preferably the solvent is evaporated at a temperature in the range of 40° to 80° C. while maintaining the solution or mixture of the silanol polymer and the resinous copolymer under pressure such as a pressure from 1 to 50 millimeters. This base compound is packaged, as such, as a separate package. There may be filler added or other additional ingredients as will be explained below. However, preferably, none of the desired fillers, especially the pigmented fillers, are added to this component; since it is desired to maintain a clear base into which there can be added either a colored or a clear catalyst second component to result in either a clear or a opaque molding composition. It should also be noted that a preferred range for the concentration of the silanol end-stopped polymer is from 90 to 98.6 parts by weight of a silanol end-stopped polymer with from 1.4 to 10 parts by weight of the resinous copolymer. It should be noted that if insufficient resinous copolymer is added to the system, then the system will not have sufficient adhesive bond strength and the only method of increasing the strength will be to add filler wherein if too much of the filler is added there will result a poor composition with poor physical properties. Too much of the resinous copolymer in a composition, that is beyond 17 parts by weight, will result in a composition which is too brittle (low elongation) when fully cured. Also cure time will be lengthtened due to high concentration of silanol groups having been introduced by the silicone resin. Cost of final product will also be increased by use of large amounts of this silicone resin.

With 100 parts by weight of the first mixture, there is added anywhere from 1 to 20 parts by weight of a second catalyst mixture, or second catalyst component package, or part, as it may also be called by a worker skilled in the art. The catalyst mixture contains from 10 to 50 parts by weight of the alkyl silicate of the formula given previously and partial hydrolysis products thereof, where $R^1$ and $R^2$ are monovalent hydrocarbon radicals and then m is 0 or 1, and is preferably 0. The radicals $R^1$ and $R^2$ can be any of the monovalent hydrocarbon radicals previously given for $R^4$ and $R^5$ and are most preferably ethyl. Most preferably the alkyl silicate of Formula 1 is ethylorthosilicate. Ethylorthosilicate is well known and is prepared by methods well known to workers so skilled in silicone chemistry.

In the second component, there is mixed with the 10 to 50 parts by weight of the alkyl silicate at least 10 parts by weight of the tin salt of a carboxylic acid. The carboxylic acid can be a monocarboxylic acid or a dicarboxylic acid, but it is more preferably a monocarboxylic acid. Almost all tin salts can be utilized but the preferred tin salt that should be utilized and the most active in the systems of the present invention are dibutyl tin dioctoate, dibutyl tin neodecanoate, dibutyl tin dilaurate.

The tin salt must be pre-reacted with the alkyl silicate or partial hydrolysis product of alkyl silicate of Formula (1) before it is incorporated into the second component so as to solubilize the tin salt in silicone base compositions. If it is not solubilized, then it will cure such base compositions more slowly and erratically. The pre-reacted product is obtained in accordance with the methods disclosed by Lewis et al. U.S. Pat. No. 3,186,963 and Smith U.S. Pat. No. 3,957,704. Preferably, the alkyl silicate of Formula (1) or the partial hydrolysis product thereof, along with the tin salt, are reacted at a temperature of anywhere from 70° to 160° a period of time varying from 20 minutes to 8 hours and most preferably varying from 20 minutes to 2 hours. In other respects, the details as to the process for preparing pre-reacted catalysts can be obtaind from the disclosures of U.S. Pat. No. 3,957,704 or from Lewis U.S. Pat. No. 3,186,963.

Finally, within the above concentration of ingredients, that is of tin salt and alkyl silicate which are pre-reacted in the concentration disclosed above, there can be added from 10 to 30 parts by weight of a self-bonding additive with Formula (2) where $R^3$ E and O are as above defined. Most preferably, small a is equal to zero and E is equivalent to an alkoxy group of 1 to 8 carbon atoms and $\theta$ is a nitrogen functional amine group appended to the silicone atom through a divalent hydrocarbon radical. The most preferred self-bonding additive is gamma-aminopropyltriethoxy silane. Other preferred self-bonding additives within the scope of formula (2) are as follows:

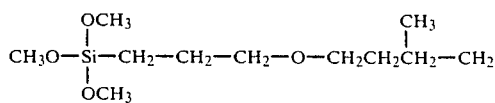

-continued

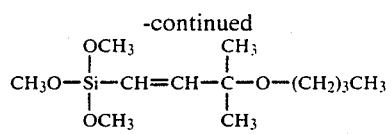

The preparation of such self-bonding additives and their use in two part RTV composition, and their use in a different two part RTV composition is disclosed in U.S. Pat. No. 3,888,815 which is hereby incorporated by reference. For further details to such self-bonding additives, the worker skilled in the art is referred to the foregoing patent for the preparation of self-bonding additives. It should be noted that within the above broad range as disclosed above, there may be utilized anywhere from 10 to 30 parts by weight of the alkyl silicate of Formula (1) with 10 parts by weight of the tin salt of the carboxylic acid with 10 to 20 parts by weight of the self-bonding additive of Formula (2). This is the preferred range of the broad range disclosed above. There is utilized sufficient self-bonding additives to give the composition the desired self-bonding properties without going to excess which would result in a composition curing so fast that it does not have sufficient adhesion properties or self-bonding properties. The amount of alkyl silicate and the tin salt are monitored by the fact that there is sufficient amounts added to cure the at a sufficiently fast rate and at the same time, give it a long enough pot life so it can be utilized or applied in whatever state it is desired before it starts to set.

As stated previously in Formula (2) preferably, $R^3$ is an alkyl radical from 1 to 8 carbon atoms, and preferably methyl, and a is preferably zero, E is preferably an alkoxy radical from 1 to 8 carbon atoms and $\theta$ is preferably an amine group appended to the silicon atom through a divalent hydrocarbon radical of 2 to 8 carbon atoms, and most preferably from 3 to 8 carbon radicals. These are the preferred nitrogen functional self-bonding additives and there can be utilized in the compositions of the instant invention any other self-bonding additives within the scope of U.S. Pat. No. 3,888,815. Further per 100 parts of the first mixture may be utilized anywhere from 1 to 20 parts and more preferably 1 to 10 parts by weight of the second mixture. It should also be noted that in the second; mixture that the self-bonding additive is miscible in the pre-reacted catalyst mixture of the tin salt and the alkyl silicate. Accordingly, one homogeneous mixture is usually formed which can be incorporated easily into the first component or first mixture to form the desired RTV composition of the instant case. In the first mixture, there may be from 1 to 20 parts of silica fillers selected from the class consisting of fumed silica and precipitated silica. More preferably, there is utilized from 1 to 10 parts of silica filler in the first mixture. Organo silicone or silazane treated silica fillers such as those described in Lucas U.S. Pat. No. 2,938,009, Lichtenwalner U.S. Pat. No. 3,004,859 and Smith, U.S. Pat. No. 3,635,743 may also be utilized in the instant composition, either in the first part or the second part.

There may also be utilized in the second mixture from 1 to 50 parts by weight of a silica filler selected from the class consisting of fumed silica and percipitated silica. Again this silica filler may be treated with silicone compounds as set forth above. One to 50 parts by weight is based on the concentration of the other ingredients as specified above for the second mixture. In that respect from 1 to 20 parts by weight of silica filler is for the concentration mixture of the ingredients is set forth for the first mixture as set forth previously. In the second mixture, there is preferably utilized from 1 to 20 parts by weight of the silica filler and preferably fumed silica filler. Preferably the fumed silica or the precipitated silica is utilized in the second mixture so as to give the mixture cohesiveness in the uncured state such that other extendi filler may be utilized in the mixture will tend not to precipitated out. Accordingly, there may be utilized an extending filler in mixture (1) or mixture (2). Examples of extending fillers, for instance, titanium dioxide, lithopone, zinc oxide, zirconium silicate, silica aerogel, iron oxide ($Fe_2O_3$) diatomaceous earth, calcium carbonate, glass fibers, magnesium oxide, chromic oxide, zirconium oxide, aluminum oxide, crushed quartz, calcined clay, asbestos, carbon, graphite, cork, cotton, synethetic fibers, etc. The most preferred extending filler is calcium carbonate. The extending filler is preferred if it is desired to have an opaque composition. Preferably, the extending filler is incorporated in the second mixture or second component although it can be incorporated in the first component or first mixture, if desired.

When the second component without filler is utilized along with the first component without filler, there is obtained a clear encapsulating composition as is desired for solar applications (photovoltaic cell encapsulation). However, when it is desired to have an opaque potting composition rather than a clear potting composition, then an extending filler may be utilized in the second mixture, or second component, and this component may be mixed with the same base or same first mixture, as was utilized to produce the clear gel and result in an opaque composition. Accordingly, it is preferably utilized in mixture (1) from 5 to 50 parts by weight of an extending filler and more preferably, there is utilized 5 to 100 parts of an extending filler in mixture (2) rather than in mixture (1). More preferably, there is utilized in mixture (1), from 5 to 20 parts by weight of an extending filler. If the filler is utilized in mixture (2), there is preferably utilized from 5 to 50 parts by weight of an extending filler. Within the broad ranges disclosed above, it is desired to have a filler in a composition for (3) three reasons: to produce opacity, if desired, to give the composition some strength properties and third of all to act as a filler in the composition so as to lower the cost of the total composition. Most preferably, there is utilized from 5 to 100 parts by weight and even more preferably, from 5 to 50 parts by weight of an extending filler in mixture (2) and there is utilized no fillers in mixture (1). The preferred extending filler is calcium carbonate because of the opacity properties that it imparts to the composition and also because of its cheapness.

There may also be incorporated in mixture (2) from 1 to 20 parts by weight of fumed silica which is a reinforcing filler, which is preferably treated. The reinforcing filler, or fumed silica, acts as an agent to maintain the integrity of the second mixture and to minimize the oil from separating out. It should be noted that some oil will separate out from the second mixture upon standing but this can usually be mixed or disposed easily into the second mixture by simply shaking the mixture by whatever means is available.

In addition to the other ingredients shown above and in the concentration as disclosed above, there is preferably in mixture 2, from 10 to 30 parts by weight of a vinyl terminated linear diorganopolysiloxane fluid having a viscosity varying from 100 to 50,000 centipoise at 25° C. where the organic group is a monovalent hydrocarbon radical and can be any of the radicals given previously for the $R^4$ and $R^5$ of the polymer of Formula (3). This fluid is utilized as a dispersant for the filler in mixture (2); that is an additional silicone fluid for wetting out the filler that is added and dispersing it properly in mixture (2). This vinyl terminated linear diorganopolysiloxane is utilized in the quantities that are necessary. It is an optional ingredient and can be utilized in whatever amounts are necessary to wet out the filler that is present in mixture (2) and that will depend, of course, on the amout of the filler that is utilized. More preferably, the fluid has a viscosity varying from 100 to 10,000 centipoise at 25° C., and as a fluid is well known to the art. It should be noted that the methylsiloxy end-stopped diorganopolysiloxane fluids are not utilized in this application since such fluids by the method in which they are prepared have incorporated in them some silanol groups. Such silanol groups are undesired in the compositions in the instant case since they would cause the degradation of the alkyl silicate as a cross linking agent thus, shortening the shelf life of mixture (2) or the second component prior to use. Preferably, the vinyl terminated linear diorganopolysiloxane fluid is a vinyl linear dimethyl polysiloxane fluid having a viscosity varying from 100 to 10,000 centipoise at 25° C.

Such fluids are made by a process well known in the art and consists in taking the appropriate cyclopolysiloxanes and equilibrating them with a vinyl terminated low molecular weight linear siloxane such as divinyl tetramethyl disiloxane. There is utilized as a equilibration catalyst a small amount of KOH and the mixture is heated to temperatures above 100° C., so as to equilibrate and produce the final desired polymer. The final desired polymer can then be utilized after the alkyl metal hydroxide catalyst, or the KOH catalyst has been neutralized with phosphoric acid and the unwanted cyclics vented off.

Finally, in the present composition and particularly in mixture (2), there can be present from 0.01 to 1 parts by weight of polyalkylene polyol as a solution stabilizer. The reasons for the desirability of such a polyol as stated previously, when mixture (2) has a filler in it and it stands, an oil separates out. Although this oil can be easily dispersed into the rest of the mixture by a simple shaking, the formation of the separation of the oil can be prevented by the utilization of the polyalkylene polyol solution stabilizer. Examples of such polyalkylene polyols can be found in the patent application of Wright, et al. Docket Number 60 SI-281, Ser. No. 34,212, U.S. Pat. No. 4,261,758 entitled Room Temperature Vulcanizable Silicone Rubber Compositions With Sag-Control, filed on Apr. 30, 1979. The polyether is selected from compounds of the formula, $$A-O-(C_xH_{2x}O)_y-B$$

and $$(A-O-(C_xH_{2x}O)_n-_y(Q)_z$$

where A and B represent radicals selected from the class consisting of radicals containing from 1 to 12 carbon atoms, cycloalkyl radicals containing from 5 to 7 carbon atoms in the ring, mononuclear and binuclear aryl radicals and mononuclear aryl lower alkyl radicals wherein the alkyl groups attached to the aromatic nucleus contain a total of no more than 5 carbon atoms;

wherein R is alkyl containing from 1 to 11 carbon atoms; Q is a residue of a polyhydric initiator radical containing at least two hydroxyl radicals selected from the class consisting of ethylene glycol, glycerol, trimethylolpropane, and other polyhydric alcohols having from 2 to 6 hydroxyl groups, v is a number having a value from 4 to 2,000; x is a number having a value of 2 to 4; y has a value of from 2 to 10; and z has a value from 1 to 5; the polyether having a molecular weight of from about 300 to about 200,000.

For further information as to the definition of this compound as well as the method of preparation for a worker skilled in the art, refer to Wright Ser. No. 34,212 which is hereby incorporated by reference. Again, this polyether is optional and may not be used.

In addition to the above ingredients, there may be added microballoons which may act as a method of producing a lower cost composition. There may be utilized lead fillers so that the composition can resist radiation, there may be utilized ferric particles to give the composition magnetic properties. There may be utilized flame retardant additives such as antimony oxide or various other ingredients. Preferably all of these additional ingredients are added in the second mixture or second component. As stated previously, there is preferably utilized no fillers in the first component or first mixture. If there is utilized fillers, there is utilized a small amount of reinforcing fillers such as fumed silica. In the second component there may be incorporated fillers and other ingredients. The base polymer or the first component of the first mixture may then be utilized in various types of second mixture which have fillers or don't have fillers so as to produce a clear encapsulant composition which may be utilized for encapsulating photovoltaic cells. By incorporating fillers in the second mixture, the same base composition or first mixture may be utilized with a slightly different second mixture, but within the scope of the instant invention, to produce an opaque potting composition for automotive electronic parts. It should be noted that the instant composition which is self-bonding is completely solventless so that it does not present any pollution problems with respect to being utilized in any plant or facility. The examples below are given for the purpose of illustrating the present invention and are not given for any purpose of setting limits and boundaries to the instant invention. All the parts and examples are by weight.

EXAMPLE 1

There was prepared a base composition, or Component A comprising 90.09 parts by weight of a dimethyl polysiloxane polymer in which the silanol stopped polymer had a viscosity varying from 1000 to 3,500 centipoise at 25° C. With this polymer, there was mixed 8.49 parts of a silanol end-stopped dimethyl polysiloxane polymer of a viscosity in the range of 500 to 700 centipoise. To this, there was added 1.42 parts of a resin composed of trimethyl siloxy monofunctional units and SiO2 tetrafunctional siloxy units with a molar ratio of monofunctional units to tetrafunctional units of 0.8.

This composition was prepared by taking a 60% solution of the resinous compolymers in xylene (14.29 parts of resinous copolymers) and mixing it with 85.71 parts of a silanol end-stopped dimethyl polysiloxane polymer (viscosity 500–900 cps) mixture was heated, under vacuum, to remove all the xylene. When no more xylene was detectable in the batch, the batch was cooled. To every 9.91 parts of this material was added, with mixing, 90.09 parts of a silanol end-stopped dimethyl polysiloxane polymer (viscosity 2,500–3,500 cps). This resulted in Composition A.

Then there was prepared a composition B which comprised a prereacted catalyst base, which was obtained by reacting 10.81 parts of ethylorthosilicate with 3.60 parts of dibutyl tin dilaurate which was reacted for two hours at 140° C. until no more tin carboxylic bands appeared at 6.2 to 6.4 microns in the infra red spectrum of the mixture. To this pre-reacted catalyst there was added 25.58 parts of gamma aminopropyl-triethoxysiloxane. To this 40 parts by weight of the pre-reacted mixture there was added 7.0 parts of fumed silica treated with hexamethyldisilazane, 28 parts by weight of calcium carbonate, 25.0 parts of vinyl terminated dimethyl polysiloxane polymer having a viscosity of 20,000 centipoise at 25° C. This composition was mixed together to form Composition B. To 100 parts of Composition A, there was added 10 parts of Composition B and the mixture deaired in a vacuum dessicator for 5 minutes. The electrical part was potted and allowed to cure 2 hours at room temperature and then subjected to an accelerated cure of 2 hours at 50° C. The time and temperatures of cures are not important since the material will cure in 24 hours, the adhesion being developed fully in 48 hours. The 50° cure does, however, aid in rapid adhesion development. Our original sample passed all electrical and mechanical tests. Parts were potted with these compositions and successfully cycled. The finished part was additionally cycled from −5° F. to 212° F. for 5 cycles, with a cycle taking place in 240 minutes (120 @ −50° F. 120 @ 212° F.) without the RTV cracking or there occurring a loss of adhesion to the sides of the metal box containing the electrical component.

A customer evaluated this material potted in a transistorized ignition system. Tests were conducted on material cured 1 hour at room temperature, 1 hour @ 70° C., followed by a rest period of 48 hours at room temperature. The potted units passed all standard electrical tests required of the transistorized ignition system. These tests include: the finished potted part was subjected to thermal cycling −30° to +110° C. for 10 days. Further, the potted part was stored at 85% rel humidity and at 85° C. for 10 days, and the electrical tests repeated. The potted part was stored at 125° C. for 1000 hours and the electrical tests repeated.

EXAMPLE 2

There was then prepared a composition in which Composition A of Example 1 was mixed with Composition B of Example 1 in which there was utilized per 100 parts of Composition A, 10 parts of Composition B. The shelf age of Composition B appeared to be in excess of at least 6 months, as determined as follows:

| SHELF LIFE OF PASTE CATALYST COMPOSITION B 1 PART TO 10 PARTS COMPOSITION A | | | | | | | | | |
|---|---|---|---|---|---|---|---|---|---|
| Viscosity, cps × 10³ | 12.6 | 14.8 | 14.2 | 15.0 | 15.0 | 6.0 | 1.5 | 0.1 | 0.1 |
| Work Time, minutes | 90 | 58 | 59 | 80 | 95 | 78 | 75 | 203 | 245 |
| Tack Free Time, minutes | 120 | 98 | 89 | 95 | 95 | 98 | 135 | 240 | 255 |
| 24 Hour Shore A | 15 | 10 | 12 | 14 | 17 | 10 | 9 | 9 | 8 |
| Days Catalyst | | | | | | | | | |
| Aged at R.T. | 0 | 17 | 26 | 88 | 164 | — | — | — | — |
| at 50° C. | — | — | — | — | — | 17 | 26 | 87 | 164 |

Work life @ 164 Days R.T. = 95
@ 50° C. = 245
Ratio W/L 50° C. / W/L RT = 2.6
164 × 2.6 = 426 Days RT Age (Estimated)

The only peculiar characteristic observed with this catalyst has been, that at 50° C. age, the viscosity drops dramatically from 12,600 centipoise to 100 centipoise at 90 days, yet the cure rate appears still acceptable.

This phenomena appears to be a general one in any paste catalyst containing high levels of cross linker and adhesion promoter that is ethylorthosilicate and gamma-aminopropyltriethoxy silane.

EXAMPLE 3

There was prepared a formulation for solar encapsulating. The same Composition A as in Example 1 was utilized. There was further prepared a catalyst composition, Composition C which was comprised of the reaction product of 75 parts by weight of tetraorthosilicate reacted with 25 parts of dibutyl tin dilaurate wherein the reaction conditions and times were as specified above for Composition B of Example 1. To 36.04 parts of the above reacted, there was added 63.96 parts of gamma aminopropyltriethoxy silane. It should be noted that both in Composition B and in Composition C that the gamma aminopropyltriethoxy silane is mixed into the pre-reacted material by agitating for 1 hour either in a mixture or a drum roller. To 100 parts of Composition A there was added 5 parts of Composition C to form a solar photovolataic cell encapsulent or potting material. Glass plates were coated with between 2 to 5 mills of the mixed material. After coating the glass plates, were placed in an Atlas Weatherometer and exposed to the normal cycle of rain (18 minutes every 2 hours) and sunshine (continuously) for a total of 392 hours without any loss of adhesion or discoloration of the film due to applied ultraviolet radiation, being observed. A sample of the same RTV composition, applied to glass was exposed to ultraviolet radiation, 360 millimicrons wave length, for a total of 83 days with again no discoloration of the film. Additional tests were performed by selected prospective users of photovoltaic cells. The photovoltaic cells were successfully encapsulated with the material and performed successfully in actual field tests.

EXAMPLE 4

To 22.20 parts of a vinyl stopped dimethyl polysiloxane polymer was added, in suitable mixing equipment such as a change can mixer-Ross, Day, or Baker Perkins mixers-4.76 parts of fumed silica previously treated with methyl tetramer, mixing technology disclosed in U.S. Pat. No. 3,004,859 Lichtenwalner, and 0.05 parts of a polyalkylene polyol, (ethylene propylene polyol).

This material was mixed for 1 hour at 120° C. Then 32.99 parts of calcium carbonate was added and thoroughly blended to uniformity. Finally, with the batch cooled to below 35° C., 40.0 parts of Composition C (i.e. 10.81 parts ethylorthosilicate and 3.60 parts dibutyl tin dilaurate mixed for 2 hours at 140° C. and then add 25.58 parts of aminopropyltriethoxysilane); were mixed into the batch under an $N_2$ purge. The resulting paste catalyst was shelf aged similiarly to Composition B above. Again the base used with this paste catalyst was Composition A above.

| SHELF LIFE OF PASTE CATALYST COMPOSITION OF EXAMPLE 4 ABOVE USED AT 1 PART TO 10 PARTS OF COMPOSITION A BASE | | | | | | | | | |
|---|---|---|---|---|---|---|---|---|---|
| Viscosity cps × 10³ | 12.1 | 13.1 | 16.0 | 12.6 | 17.2 | 9.6 | 10.6 | 1.5 | 0.1 |
| Work life, minutes | 31 | 55 | 42 | 32 | 79 | 40 | 35 | 62 | 276 |
| Tack free time, minutes | 57 | 100 | 87 | 72 | 79 | 75 | 95 | 108 | 280 |
| 24 hour Shore A | 3 | 4 | 3 | 13 | 16 | 4 | 4 | 11 | 11 |
| Days Catalyst | | | | | | | | | |
| Aged at R.T. | 1 | 7 | 10 | 41 | 123 | | | | |
| at 50° C. | — | — | — | — | — | 7 | 10 | 25 | 123 |

NOTE:
LESS OIL SEPARATION WAS NOTED WITH THIS PASTE CATALYST FORMULATION THAN WAS NOTED IN COMPOSITION B. EVEN THOUGH VISCOSITY AGAIN DROPPED TO 100 cps. AT 123 DAYS AT 50° C.
ESTIMATED R.T. SHELF AGE 3.49 × 123 = 429 DAYS Given that the formulation is similiar to Composition B, and ages similiarly, it is believed to be an acceptable catalyst for potting applications where improved oil separation may be desired.

I claim:

1. A self-bonding, soventless, room temperature vulcanizable silicone rubber composition comprising:
    (1) 100 parts by weight of a first mixture comprising
        (A) 83 to 98.6 parts by weight of a silanol endstopped diorganopolysiloxane polymer having a viscosity varying from 100 to 4000 centipoise at 25° C., wherein the organo groups are monovalent hydrocarbon radicals, and (B) 1.4 to 17 parts by weight of resinous copolymer comprising $R_3SiO_{0.5}$ units and $SiO_2$ units, wherein R is a monovalent hydrocarbon radical and wherein said copolymer has from 0.5 to 1 $R_3SiO_{0.5}$ unit per $SiO_2$ unit; and (2) 1 to 20 parts by weight of a reacted catalyst mixture comprising:

(C) 10 to 50 parts by weight of an alkyl silicate of the formula $$(R^1)_m Si(OR^2)_{4-m}$$

and partial hydrolysis products thereof, wherein $R^1$ and $R^2$ are monovalent hydrocarbon radicals, m is 0 or 1, and which is pre-reacted (D) 10 parts by weight of a tin salt of a carboxylic acid, (E) 10 to 30 parts by weight of a self-bonding additive having the formula $$E_{(3-a)}Si-\theta \overset{(R^3)_a}{|}$$

wherein $R^3$ is a monovalent hydrocarbon radical, E is a hydrolyzable group selected from the group consisting of alkoxy, phenoxy, amino and dialkylamino, and $\theta$ is a nitrogen functional radical which is reacted with unsaturated or aromatic hydrocarbon residue, which in addition to nitrogen functionality may be functionalized by a radical selected from the group consisting of amino, cyano, thio, oxo and ester, and combinations thereof, and a is a number varying from 0 to 2, (F) 10 to 40 parts by weight vinyl terminated linear diorganopolysiloxane fluid having a viscosity varying from 100 to 50,000 centipoise at 25° C., wherein the organo groups are monovalent hydrocarbon radicals and wherein said diorganopolysiloxane fluid is a dispersant for filler, and (G) 5 to 100 parts by weight of an extending filler, 1 to 50 parts by weight of a reinforcing filler, or mixture thereof.

2. The composition of claim 1 wherein the vinyl terminated diorganopolysiloxane fluid is a vinyl-terminated dimethylpolysiloxane having a viscosity varying from 100 to 10,000 centipoise at 25° C.

3. The composition of claim 2 wherein mixture comprises 0.01 to 1 part polyalkylene polyol.

4. The composition of claim 1 wherein the silanol endstopped diorganopolysiloxane is a blend of two or more silanol endstopped polymers, wherein at least one of the polymers has a viscosity in the range of 1000 to 10,000 centipoise at 25° C. and at least one of the polymers has a viscosity in the range of 10 to 1500 centipoise at 25° C.

5. The composition of claim 1 wherein in the resinous copolymer R is methyl and the ratio of $(CH_3)SiO_{0.5}$ units to $SiO_2$ units ranges from 0.525 to 1 to 0.775 to 1.

6. The composition of claim 1 wherein the alkyl silicate is tetraethyl orthosilicate.

7. The composition of claim 1 wherein the self-bonding additive is gamma-aminopropyltriethoxysilane.

8. The composition of claim 1 wherein the tin salt of a carboxylic acid is dibutyltindilaurate.

9. A process for forming a self-bonding, solventless, room temperature vulcanizable silicone rubber composition comprising:
(a) mixing (1) 100 parts by weight of a first mixture comprising:

(A) 83 to 98.6 parts by weight of a silanol endstopped diorganopolysiloxane polymer having a viscosity varying from 100 to centipoise at 25° C., wherein the organo groups are monovalent hydrocarbon radicals, and 1.4 to 17 parts by weight of resinous copolymer comprising $R_3SiO_{0.5}$ units and $SiO_2$ units, wherein R is a monovalent hydrocarbon radical and wherein said copolymer has from 0.5 to 1 $R_3SiO_{0.5}$ unit per $SiO_2$ unit; and (2) 1 to 20 parts by weight of a reacted catalyst mixture comprising:

(C) 10 to 50 parts by weight of an alkyl silicate of the formula $$(R^1)_m Si(OR^2)_{4-m}$$

and partial hydrolysis products thereof, wherein $R^1$ and $R^2$ are monovalent hydrocarbon radicals, m is 0 or 1, and which is pre-reacted with (D) 10 parts by weight of a tin salt of a carboxylic acid, (E) 10 to 30 parts by weight of a self-bonding additive having the formula $$E_{(3-a)}Si-\theta \overset{(R^3)_a}{|}$$

wherein $R^3$ is a monovalent hydrocarbon radical, E is a hydrolyzable group selected from the group consisting of alkoxy, phenoxy, amino and dialkylamino, and $\theta$ is a nitrogen functional radical which is reacted with unsaturated or aromatic hydrocarbon residue, which in addition to nitrogen functionality may be functionalized by a radical selected from the group consisting of amino, cyano, thio, oxo and ester, and combinations thereof, and a is a number varying from 0 to 2, (F) 10 to 40 parts by weight vinyl terminated linear diorganopolysiloxane fluid having a viscosity varying from 100 to 50,000 centipoise at 25° C., wherein the organo groups are monovalent hydrocarbon radicals and wherein said diorganopolysiloxane fluid is a dispersant for filler, and (G) 5 to 100 parts by weight of an extending filler, 1 to 50 parts by weight of a reinforcing filler, or mixture thereof.

10. The process of claim 9 wherein the vinyl terminated diorganopolysiloxane fluid is a vinyl terminated dimethylpolysiloxane having a viscosity varying from 100 to 10,000 centipoise at 25° C.

11. The process of claim 10 wherein mixture (2) further comprises 0.01 to 1 part polyalkylene polyol.

12. The process of claim 9 wherein the silanol endstopped diorganopolysiloxane is a blend of two or more silanol endstopped polymers, wherein at least one of the polymers has a viscosity in the range of 1000 to 10,000 centipoise at 25° C. and at least one of the polymers has a viscosity in the range of 10 to 1500 centipoise at 25° C.

13. The process of claim 9 wherein in the resinous copolymer R is methyl and the ratio of $(CH_3)_3SiO_{0.5}$ units to $SiO_2$ units ranges from 0.525 to 1 to 0.775 to 1.

14. The process of claim 9 wherein the alkyl silicate is tetraethyl orthosilicate.

15. The process of claim 9 the self-bonding additive is gamma-aminopropyltriethoxysilane.

16. The process of claim 9 wherein the tin salt of a carboxylic acid is dibutyltindilaurate.

* * * * *